Nov. 20, 1951  H. W. GOFF  2,575,952
BELT
Filed April 28, 1948

INVENTOR
H. W. GOFF
BY Charles D Richard
AGENT

Patented Nov. 20, 1951

2,575,952

UNITED STATES PATENT OFFICE 2,575,952

BELT

Harold W. Goff, Manhasset, N. Y.

Application April 28, 1948, Serial No. 23,749

5 Claims. (Cl. 2—321)

This invention relates to belts of the type used, for example, for securing trousers to the waist of a person. More specifically, this invention has reference to a novel belt and fastening device whereby the two ends of such belt may be secured in superimposed relation to each other in a plurality of peripheral belt adjustment positions.

The object of the present invention is the provision of a belt and securing device therefor of the type above referred to, which will be simple in construction, lasting and convenient in use.

Figure 1:
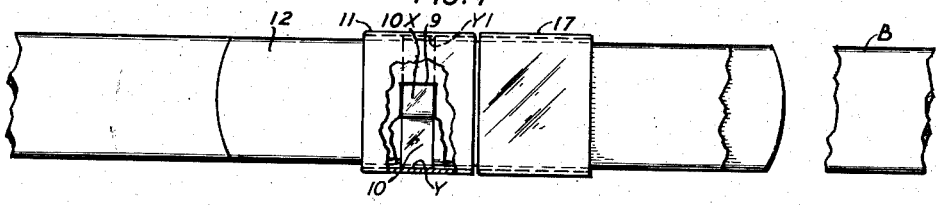
Fig. 1 is a partial view of the belt showing the different elements of the belt and its co-operating fastening device in assembled relation to each other, a number of elements of the fastening device being shown with portions broken away.
Figure 2:
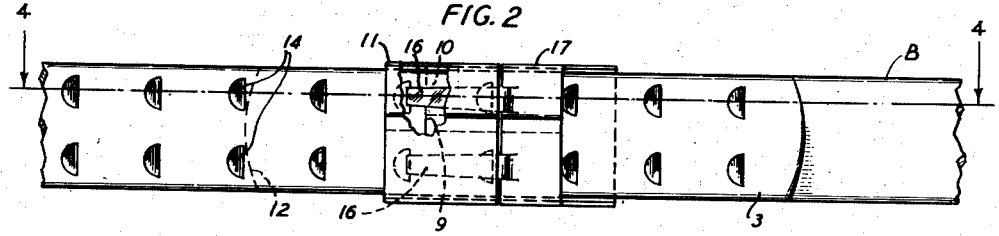
Fig. 2 is a rear view of Fig. 1, shown with one of the elements of the fastening device with portions broken away.
Figure 3:
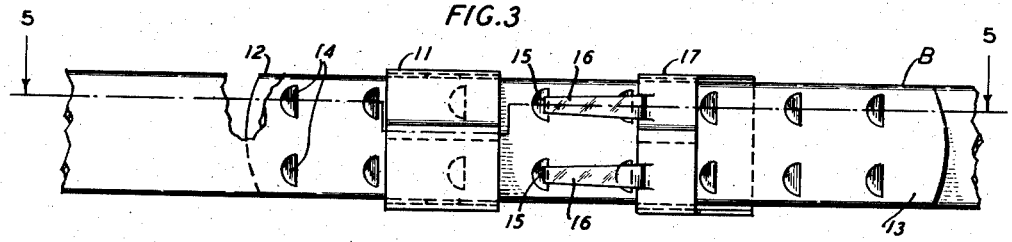
Fig. 3 is a view showing the adjustable element of securing device disengaged from its cooperating element attached in fixed position to one end of the belt.

According to the construction of the belt and fastening device of this invention a relatively short length of tubing element 11, which may be made of any desired material and of rectangular cross-section is formed interiorly across with a dimension slightly greater than that of the width or transverse side of the belt B and its sides twice the thickness of such belt, so as to permit free longitudinal movement of one end of the belt as 13 relative to and in superposed relation to the opposite end 12 of the belt. Tubing element 11 is secured adjacent to the end 12 of the belt by a metallic strip 10 shown in Figs. 1, 2, 4, 5 and 6, this strip having its ends secured as by welding at points y and y₁ to the sides of tubing element 11 interiorly thereof and formed at its middle length portion with a substantially U-shaped bent portion 10 provided for engaging a square-shaped opening 9 in the end 12 of the belt as best seen in Figs. 1, 5 and 6 for securing the tubing element 11 against movement on this end of the belt.

A second tubing element 17 of rectangular cross-section and of an interior dimension similar to that of tubing element 11 is provided with two projecting arms 16 best seen in Figs. 2, 3, 4, 5 and 6 terminating at their free ends with bent portions extending substantially at right angles to the lengths of the tubing element 17 to form hook members as 15, serving for engaging respective notches or stop elements 14 arranged by pairs formed into the belt along a suitable length thereof from its end 13. The arms 16 are offset by an amount substantially equal to the thickness of the material used to form the tubing elements 11 and 17 so as to maintain these two tubing elements in coaxial relation when the hook portions 15 are engaged with their respective stops, in any one pair, followed by a pulling action on the opposite ends 12 and 13 of the belt, thus causing the arms 16 to enter into the tubing element 11 to a point wherein the tubing element 17 abuts against tubing element 11 as in the position shown in Figs. 1, 2 and 4, the hook portions 15 being locked in engagement with the stops or notches 14 for securely holding the ends of the belt in that peripheral adjustment.

Figure 4:
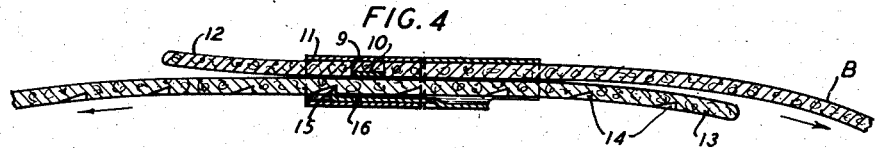
Fig. 4 is a longitudinal sectional view taken on line 4—4 of Fig. 2.
Figure 5:
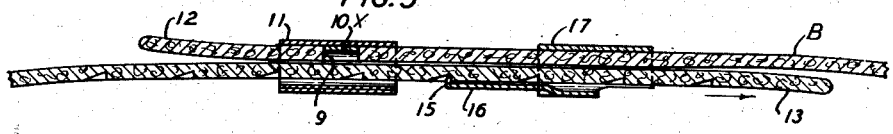
Fig. 5 is a longitudinal sectional view taken on line 5—5 of Fig. 3.
Figure 6:
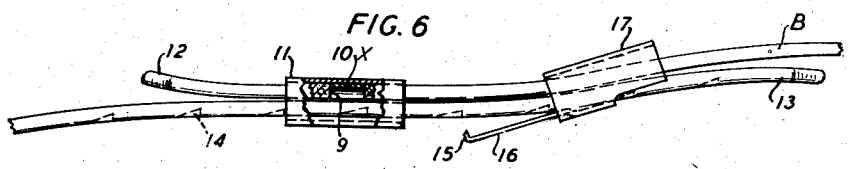
Fig. 6 is a view showing the adjustable element in disengaged position from the belt and from its cooperating element which is permanently secured to the belt.

The disengagement of the arms 16 from tubing element 11 is effected by the movement of the end 13 of the belt away from tubing element 11 in the direction indicated by the arrow in Fig. 5 and tipping the tubing element 17 as shown in Fig. 6 for disengaging the hooks 15 from the notches 14, whereupon another peripheral adjustment of the belt may be obtained by placing the hook portions 15 in engagement with the desired pair of stops 14 and pulling on the belt in the direction indicated by the arrow in Fig. 4 so as to bring the tubing element 17 toward tubing element 11 and thereby the hook portions 15 of arms 16 in locked engagement in the stops 14 formed in the end portion 13 of the belt.

It is understood that minor changes may be made in the belt and belt fastener of this invention such as the use of rivets for securing the end 12 of the belt to its tubing element 11 instead of using the metallic strip 10, and other minor changes in form, dimensions and of the material used for the construction of the operating parts, without departing from the scope of the appended claims.

What I claim is:

1. An adjustable belt having a plurality of stop elements spaced apart from one of the end portions of said belt and disposed along one of the sides adjacent the longitudinal edges of said belt, a tubing element secured to said belt a small distance from the opposite end portion of said belt, said tubing element being dimensioned interiorly for receiving the end portion of said belt having said stop elements in superposed relation to the portion of said belt secured to said tubing element, and a second tubing element slidable along said belt and dimensioned interiorly for receiving the first and second mentioned end portions of said belt in said superposed relation, said second tubing element having hook members projecting from one of its ends for simultaneously engaging a corresponding number of said stop elements when said hook members and the end portion of said belt which carries said stop elements are inserted into the first mentioned tubing element in superposed relation to the first mentioned end portion of said belt for holding the end portions of said belt against movement relative to each other.

2. An adjustable belt having a tubing element dimensioned peripherally for receiving both end portions of said belt in superposed relation to each other, means carried by said tubing element for securing said tubing element to one end portion of said belt, a second tubing element dimensioned peripherally for sliding movement over both end portions of said belt in said relation, the second mentioned tubing element having means extending longitudinally therefrom terminating with portions forming hook members, and stop means formed into the material of said belt along the opposite end portion thereof for engagement with said hook members upon the insertion of the means extending from the second mentioned tubing element into the first mentioned tubing element for securing the first and second mentioned end portions of said belt against movement relative to each other.

3. A belt having a rectangularly-shaped cross-section, a tubing element having a peripheral contour registering with the rectangularly-shaped cross-section of said belt and dimensioned for receiving both end portions of said belt in superposed relation to each other, means for securing said tubing element to one end portion of said belt, a plurality of stop elements formed into the material of said belt at the opposite end portion thereof, and a second tubing element slidable on the superposed end portions of said belt, the second mentioned tubing element having means for engaging said stop elements for securing the two end portions of said belt against movement relative to each other when the first and second mentioned tubing elements are drawn in abutting relation to each other upon a force tending to increase the peripheral diameter of said belt.

4. A belt having a substantially rectangular cross-section, a tubing element secured to one end portion of said belt dimensioned for receiving both end portions of said belt in superposed relation to each other, a row of pairs of stop elements formed into the material of said belt at its opposite end portion, a second tubing element slidable along said belt and having a pair of arms extending therefrom, said arms having means for engaging a pair of said stop elements in said row for adjusting the peripheral dimension of said belt, said arms cooperating with the first mentioned tubing element for holding said means in engagement with said pair of stop elements when said arms are inserted into the first mentioned tubing element in superposed relation to the end portions of said belt upon a pulling force tending to increase the peripheral diameter of said belt.

5. A belt having a rectangularly-shaped cross-section, a tubing element interiorly dimensioned for receiving both ends of said belt in superposed relation to each other, means for securing said tubing element to said belt, a second tubing element interiorly dimensioned for sliding movement over the end portions of said belt in said relation, a pair of arms extending from the second tubing element, a hook member formed at the free end portion of each of said arms for engaging stop means formed in the material at the opposite end portion of said belt, the first mentioned tubing element cooperating with said arms for holding each of said hook members in engagement with said stop means upon a force tending to increase the peripheral diameter of said belt.

HAROLD W. GOFF.

REFERENCES CITED

The following references are of record in the file of this patent:

UNITED STATES PATENTS

| Number | Name | Date |
|---|---|---|
| 1,682,450 | Wanninger et al. | Aug. 28, 1928 |
| 2,160,368 | Monesson | May 30, 1939 |